Jan. 9, 1968     H. O. HAZEL     3,362,405
METHOD AND APPARATUS FOR ADMIXING GAS WITH SOLID PARTICLES
Filed April 6, 1964     2 Sheets-Sheet 1
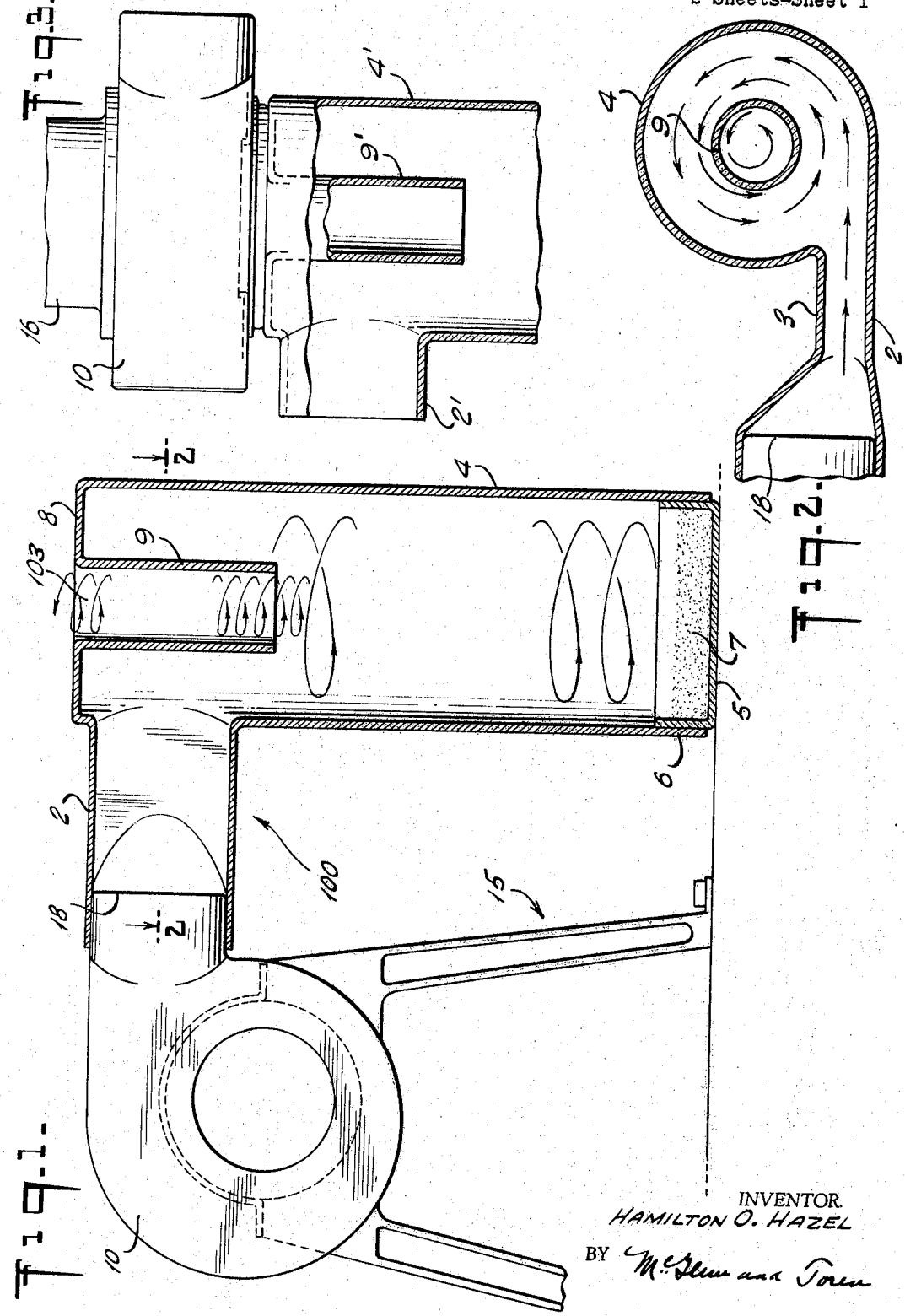
INVENTOR.
HAMILTON O. HAZEL
BY McGlew and Toren
ATTORNEYS

United States Patent Office 3,362,405
Patented Jan. 9, 1968

3,362,405
METHOD AND APPARATUS FOR ADMIXING
GAS WITH SOLID PARTICLES
Hamilton O. Hazel, 235 N. Union Road,
Williamsville, N.Y. 14221
Filed Apr. 6, 1964, Ser. No. 357,642
13 Claims. (Cl. 128—187)

This application is a continuation-in-part application of my application Ser. No. 253,724, filed Jan. 24, 1963, and now abandoned.

My invention generally relates to procedures for admixing a gas with additives and is particularly directed to a method and apparatus for adding minute quantities of solid particles of extremely small size to the atmosphere of a predetermined space, such as a room.

While my invention has a broad field of application and may be used for adding small quantities of a wide variety of solid substances such as, for example, deodorants, insecticides, flavoring agents and the like, to a body or flow of gas, my invention will be explained with particular reference to the conditioning of air by admixture thereto of minute quantities of solid particles to obtain an atmosphere which is conductive to relieve respiratory and sinus disorders.

It is well known that persons who suffer from sinus conditions and the like respiratory ailments find relief in a salt-containing atmosphere. It has thus been established that breathing is facilitated in salt mines and in ocean regions, as the small amounts of salt which are contained in the atmosphere in such areas have a tendency to clear the respiratory passages and thus to relieve congestion. By contrast, relatively large amounts of salt, in turn, tend to irritate the mucus membranes of the respiratory passages and thus negate the desired relief and beneficial effect and, in fact, may aggravate the condition.

As mentioned above, the invention relates particularly to a device for adding a solid substance, such as salt, to the air in quantities in which the salt will be maintained in the air and circulated therewith. The advantages of adding salt to the air for the treatment of certain respiratory conditions are pointed out in an article entitled "Deposition of NaCl Microaerosols in the Respiratory Tract" by L. Dautrebande, M.D. Ph.D and W. Walkenhorst, D.Sc., in the publication "Archives of Environmental Health" dated October 1961, vol. 3, pp. 47–55.

Accordingly, it is a primary object of my invention to provide means for simulating the atmosphere conditions prevailing in salt-containing regions by artificially adding minute quantities of salt particles of very small size to the atmosphere.

The term "salt" is used by me herein in a broad sense and is deemed to include ordinary sodium chloride and also other salts, such as magnesium chloride, calcium chloride and the like which are entrained by the atmosphere in ocean regions or which otherwise may have a beneficial effect on respiratory disorders.

It is also an object of my invention to provide apparatus for dispensing minute amounts of solid salt particles into the atmosphere.

Another object of my invention is to provide for a method of adding minute amounts of solid salt particles to an air stream.

Generally, it is an object of my invention to improve on the art of admixing minute quantities of solid particles of very small size to an air stream.

Briefly, and in accordance with my invention, I place a small amount of salt grains or powder in a receptacle which forms part of a dispensing container. I then subject the salt powder to the action of a turbulent or cyclone air stream whereby the individual salt particles, by attrition, are comminuted to an extremely small size. The dispensing container has exit means in the form of an opening and, due to the turbulent action of the air, minute quantities of the comminuted salt particles are entrained and carried along by the air and exit with the air through the opening. The ambient atmosphere outside the dispensing container is thus enriched by small amounts of solid salt particles whereby conditions as prevailing near the sea or in a salt mine are simulated. A person suffering of sinus or respirtory disorders will thus find relief at locations near the dispensing apparatus.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of my invention.

In the drawings:

FIG. 1 is a partly sectional side elevation of one embodiment of my inventive dispensing apparatus;

FIG. 2 is a section along line 2—2 of FIG. 1;

FIG. 3 is a fragmentary showing, partly in section, of a second embodiment of my inventive dispensing apparatus;

Figure 4:
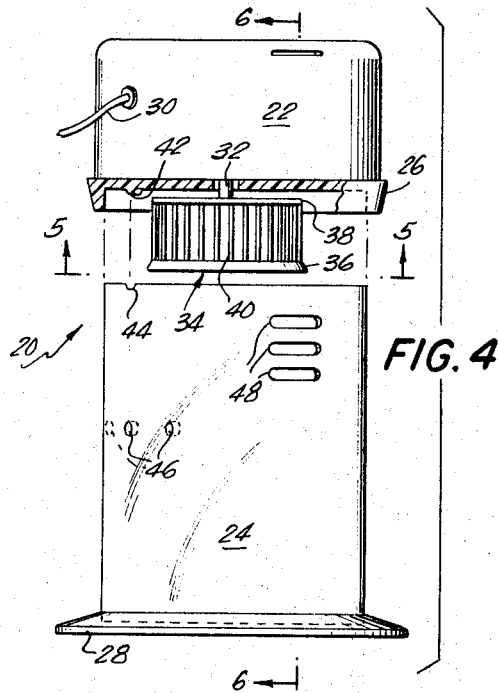
FIG. 4 is an exploded side elevational view of another embodiment of a device for adding a substance to a circulating gas or air.

Referring now to FIGS. 1 and 2, the dispensing apparatus shown therein and generally indicated by reference numeral 100 includes a blower 10 of conventional construction which is mounted on a leg-containing support generally indicated by reference numeral 15. The blower mouth 18 opens into a horizontally extending tube 2 which has a constricted portion 3, as best seen in FIG. 2. The tube 2 opens into, and is integral with, a cylindrical tube 4 which extends substantially perpendicular to tube 2. A receptacle 5 is detachably connected to the open bottom end 6 of tube 4 and contains table salt powder, indicated by reference numeral 7. The upper end of tube 4 is partially closed by top wall 8. A tubular portion 9 depends from top wall 8 to form a relatively narrow exit opening 103 which establishes communication between the interior of tube 4 and the ambient atmosphere. The tube 9 is shown to be of cylindrical shape but may have a different form, such as truncated cone. It will be noted that tube 9 extends downwardly into the tube 4 to a level which is below the area of communication between tubes 2 and 4.

The operation of the device described is as follows:

A small amount of table salt 7 as, for example, one-eighth of a tablespoon, is placed into the dish or receptacle 5 which is then fitted into the open end 6 of tube 4, as shown in FIG. 1. Usually, a slide fit between the receptacle is sufficient, but if desired, a screw connection or the like may be provided between the receptacle and the tube. It is also feasible to form the receptacle integral with the tube 4 by shaping the bottom end of the latter in conical or funnel-like manner. The funnel may then be provided with a cock or stopper for easy removal of the salt. The blower 10, which may have a low horsepower motor, as for example, 1/25 horsepower, is then turned on. The air, which is thus blown through the pipe 2, impinges on the wall of the downwardly extending tube 9 and the tube 4 and is deflected into a cyclone-like or spirally progressing air flow. Due to this turbulent air movement, the salt particles within the dish or receptacle 5 rub against each other and thus, by attrition, are comminuted to extremely small size. The force of the air flow is adjusted so as to prevent blowing about of large particles. The small particles are carried along by and suspended within the air stream, which exits through the tube 9 and thus enters the ambient atmosphere. My experiments have established that the amount of salt particles which is entrained by the air and reaches the atmosphere outside the device is hardly measurable and the particles are of micron size. In fact, most of the particles have a size below one micron. By contrast, if salt powder is simply fed through a high speed blower to break down the salt and to mix it with the air, relatively significant amounts of large size salt particles are admixed with the ambient atmosphere, which causes irritation of the mucus membranes. It is therefore an important feature of my invention that only minute quantities of salt particles of micron size reach the ambient atmosphere.

According to the embodiment of FIG. 3, a fan 16 of conventional construction and low power is mounted in detachable manner on a tube 4'. The tube 4' corresponds to the tube 4 of FIG. 1 and contains, in its bottom region, a salt-comprising receptacle (not shown). The tube 4', as in the embodiment of FIG. 1, has a downwardly extending exit tube 9' and a laterally extending pipe extension 2'. When the fan is switched on, air is sucked through the lateral pipe extension 2' into the interior of pipe 4' to perform a spiral-like or cyclone movement. This again causes attrition and thus comminution of the salt particles which are entrained by the air and exit through the pipe 9' through the fan casing and blades to enter the ambient air.

Figure 5:
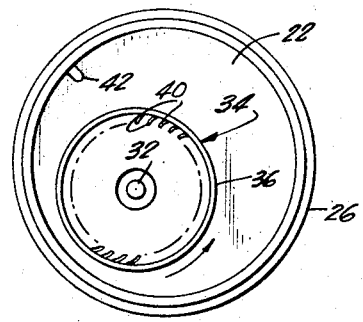
FIG. 5 is a section taken on the line 5—5 of FIG. 4.
Figure 7:
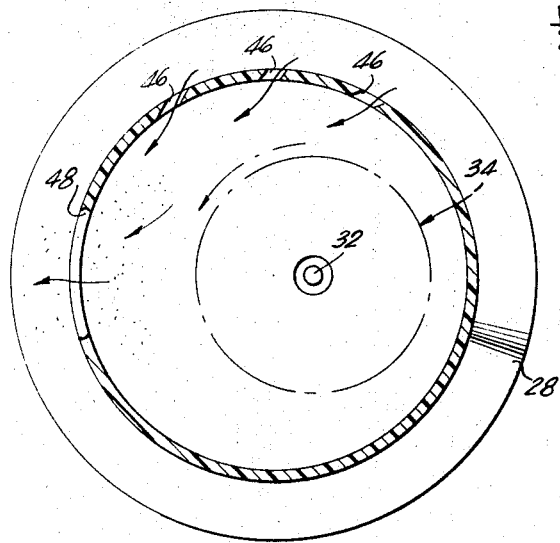
FIG. 7 is a section taken on the line 7—7 of FIG. 6.
Figure 6:
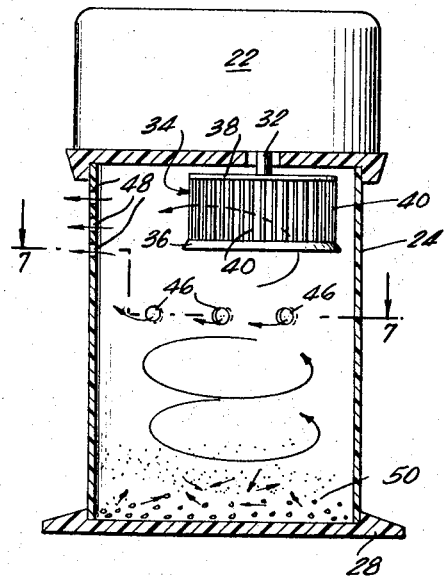
FIG. 6 is a sectional taken on the line 6—6 of FIG. 4.

In the embodiment of FIGS. 4 to 7, a device generally designated 20 is provided which is capable of adding small particles of a substance, such as salt, to a gas, such as air, and is further capable of comminuting the particles or breaking them up into extremely fine particle sizes so that they will be readily suspended in the air which is discharged from the device. The device 20 comprises a combination motor housing and cover member 22 and a cylindrical whirling chamber or tube 24. The motor housing and cover member 22 includes a skirt portion 26 which is recessed on its underface and of an interior diameter slightly larger than the diameter of the tube 24 permitting the two parts to be positioned together with the skirt 26 overlying the upper end of the tube 24.

In accordance with a feature of the invention, the tube 24 includes a pedestal or base portion 28 which enables it to be positioned on a table in a room of a house, sickroom or hospital, for the purpose of adding solid material such as salt to the air. A motor (not shown) is mounted within the combination cover and housing 22 and is supplied with electrical energy through an electrical connection cord 30 to rotate a motor shaft 32 which projects downwardly from the housing and cover 22 into the tube 24. A rotor or blower generally designated 34 is affixed to the shaft 32 for rotation therewith and includes spaced annular shroud members 36 and 38 which are interconnected by substantially radially extending blade elements 40. The combination motor housing and cover 22 includes an internal projection or formation 42 which aligns with a cutout or recess 44 of the tube 24 in order to position the fan 34 in an eccentric position within the tube 24. The tube 24 includes a plurality of small diameter inlet openings 46 which are cut tangentially into the tube to provide for the whirling intake of air or other gas which is to be admixed with a solid. In addition, the tube has a plurality of conferentially elongated and vertically spaced slot 48 which define outlet openings through which air or gas having fine particles of solid substance added thereto is discharged. The blower 34 is positioned by the projection 42 to effect most desirable whirling conditions and penetrating of the inlets 46 and discharge openings 48.

The device is operated by adding a solid substance 50 to the interior of the tube 24 after the combination cover and motor housing 22 is removed. The combination cover and motor housing 22 is then replaced and the motor energized to cause rotation of the blower 34 to produce a cyclonic whirling motion within the tube 24.

The whirling causes a rapid movement of the particles of solid substance 50 in the lower part of tube 24 and the centrifugal force acting on the particles causes them to undergo attrition to cause them to be broken up by contact with each other and the walls of the tube 24 until they are sufficiently light and minute to be moved upwardly with air which is discharged through the slot 48.

As mentioned previously, the device has particular application for adding salt to the atmosphere for the treatment of certain respiratory conditions. In the embodiment of FIGS. 4 to 7, the blower wheel or fan 34 advantageously revolves at about 3000 r.p.m. and draws room air through the inlet ports 46 to the interior of the tube 24 and then expels the air laden with salt particles through the slotted outlet ports 48 to the room atmosphere. Due to the shape and the location of the inlet ports, the shape of the tube and the eccentric position of the blower 34, a cyclonic flow of air is created within the tube. This flow causes the salt 50 to be whirled at high velocity at the bottom of the tube. Because the salt crystals are moved constantly, they are in constant collision with one another, causing them to erode or become broken up into extremely fine particles. Centrifugal force holds all of the relatively coarse particles against the lower portion of the tube. Particles that are broken down into very small submicron sizes are light enough to escape into the outlet air stream and are discharged to the room atmosphere. Such particles are so light that they stay suspended in the room air for a considerable period of time and can be breathed in.

A device of the type disclosed in FIGS. 4 to 7 is extremely inexpensive to manufacture and operates with a relatively low powered motor and a relatively low blower wheel speed. The device illustrated will handle approximately 4 cubic feet of air per minute with about two tenths of an inch water gauge pressure drop requiring a motor of 1/125 horse power operating at 3000 r.p.m. The device will operate at extremely low noise value to materially increase the salt content to the atmosphere of a room in a short time.

Studies have been made with a device of this nature to determine the operating characteristics of the embodiment indicated in FIGS. 4 to 7 and to determine the degree that the particles may penetrate the respiratory system of a human being. The information developed during a study of this nature was reported in an article entitled "Emission Characteristics of an AIR-O-MED Unit" by Charles I. Harding P.E. Research Associate of the College of Engineering, University of Florida, Gainsville, Florida in April 1963. The data collected during this study indicate that the unit tested discharged 4 cubic feet a minute of air with sodium chloride aerosol loading of 0.4 grains per cubic foot with the recommended amount of salt added to the unit. The average particle size was $1.22\mu$ with 95% of the particles between the sizes of $0.33\mu$ and $4.5\mu$.

This study indicated that the location of the horizontal slots 48 as well as the location of the blower 34 was somewhat critical. In some instances the upper one of the horizontal slots 48 functions as an inlet and a variation in the position of the blower in respect to the penetration into the tubular member 24 produced notable changes in the emission rate of the air with salt added thereto through the slot 48. The weight of the salt which is initially added into the tube 24 also influences the average emission rate.

A further study was made in respect to the effect of the operation of the unit of the invention in the treatment of sinusitis and other upper and lower respiratory tract conditions. Such a study was set forth in "A Report of a Clinical Study" by A. Berkstein, M.D. Senior Resident in Otolaryngology of the Harlem Eye and Ear Hospital, New York City. The report concluded that the use of the inventive device for adding salt to the air was very useful in the symptomatic relief of sinusitis, vasomotor rhinitis and chronic bronchitis.

Tests performed on persons suffering from sinus conditions have conclusively established that my invention offers relief and is efficient.

Thus, the inventive device was tested at the Harlem Eye and Ear Hospital in New York City in connection with twenty patients suffering from acute sinusitis, chronic sinusitis and acute upper respiratory tract infection. The treatment was given in collective sessions for about 90 minutes every day for a period of from seven to ten days. The doctors in charge of the project concluded that the device is a new symptomatic therapy for the treatment of sinus diseases and acute upper respiratory tract infections. A report issued by the Harlem Eye and Ear Hospital states:

". . . we do believe that the hygrophilic properties of the salt do liquefy the heavy mucus and mucopurulent secretions which are some of the manifestations of the already mentioned diseases, acting, therefore, as a mucolytic enzyme.

"We have had 20 patients under treatment for a period of seven to ten days and we never had any complaints or evidence that the treatment had any unfavorable reaction on patients receiving it that could be attributed to the machine directly; as objective evidence we have, in two cases at least, radiological improvement of the patients sinus condition.

"Conclusion: We think that the machine is a helpful addition to the medical weapons that can be used in the treatment of upper respiratory tract infection and in sinus conditions."

While specific embodiments of my invention have been shown and described in detail to illustrate the application of the inventive principles, it will be understood that my invention may be embodied otherwise without departing from such principles.

What is claimed is:

1. A method of admixing a gas such as air with a small amount of solid particles using a container which is closed at the bottom and includes an exit adjacent the top, which comprises placing solid particles in the container subjecting said solid particles to the action of a downwardly directed whirling gas flow to comminute said solid particles into particles of extremely small size by whirling them against the walls of the container, whereby said particles of extremely small size are entrained by said gas flow, and discharging said gas flow enriched by said small sized particles through said exit opening at a location high enough to carry only the smaller sized particles outwardly into a gas atmosphere.

2. A method as claimed in claim 1, wherein said gas flow is spirally progressing.

3. A method of dispensing into the atmosphere minute quantities of solid salt particles using a container which is closed at the bottom and has an exit spaced upwardly from the bottom, which comprises subjecting salt particles located in the container to the action of a downwardly directed whirling gas flow to comminute said salt particles by attrition at least partly to a size sufficiently small so as to be capable of remaining suspended in the atmosphere, whereby said comminuted salt particles are entrained by said gas flow, and discharging said particle-enriched gas flow through said chamber opening at a location high enough to carry only the smaller sized particles outwardly into the atmosphere.

4. Apparatus for dispensing minute quantities of small sized solid particles, which comprises a tubular casing having a closed bottom and an exit opening ajacent the top thereof, means located within said casing adjacent the bottom for receiving solid particles, and means for generating a whirling generally downward gas flow through said casing and past said means for receiving solid particles and to whirl the particles against the casing to cause abrading and diminution thereof and to cause the entraining of the smallest particles in the gas flow and discharge thereof out the exit opening.

5. Apparatus for dispensing minute quantities of solid particles, which comprises a tubular casing, a receptacle mounted at and closing one end of said casing and being adapted for holding solid particles, said tubular casing having an exit opening adjacent its top end and means for forcing an air flow downwardly into said casing in a whirling spiral movement past said receptacle, said exit opening being of a size and a location above said receptacle spaced sufficiently such that air which flows out of the exit opening carries with it only the lightest and smallest particles.

6. Apparatus as claimed in claim 5, wherein said means for forcing an air flow into said casing includes a blower and a conduit member opening into said tubular casing and extending in an angular direction relative to said tubular casing, said conduit member establishing communication between said blower and said tubular casing.

7. Apparatus for dispensing minute quantities of solid particles, comprising a tubular upright casing having a top and a bottom end, a receptacle for holding solid particles detachably mounted at and closing said bottom end, an exit pipe member coaxially arranged within said tubular casing and extending from said top end downwardly to a location above said receptacle, a conduit member extending substantially perpendicular to said tubular casing and having a first end opening tangentially into said tubular casing adjacent to the top thereof and adjacent the exterior of said exit pipe and a second end connected to a blower, said exit pipe extending to a level below that of the first end of said conduit member.

8. A device for adding small quantities of solid particles such as salt to a gas such as air, comprising a tubular member having an inlet opening and a discharge opening, said discharge opening being located adjacent the upper portion thereof, said tubular member being closed at each end, a fan mounted adjacent the upper portion of said tubular member including a fan wheel eccentrically positioned within said tubular member, and means to rotate said fan wheel to cause a whirling cyclonic movement of air within said tubular member and a rapid movement of solid particles placed in the interior of said tubular member adjacent the lower end thereof with resultant attrition thereof and a discharge of the air entrained with finer particles through said outlet.

9. A device for adding solid substances to the atmosphere, comprising a tubular member adapted to receive solid particles to be added to the atmosphere and having a bottom wall closing one end, an inlet opening defined in a side of said tubular member, an outlet opening defined in a side of said tubular member adjacent the upper portion thereof, a combination motor housing and cover member closing the top of said tubular member, a blower adapted to be connected to the motor within said combination motor housing and cover and rotatably mounted by said combination motor housing and cover in a position eccentric to said tubular member and located sufficiently downward into said tubular member whereby at least a portion is in the vicinity of said discharge opening, said blower being rotatable to cause cyclonic movement within said tubular member and the rapid rotation of solid particles in the lower portion thereof with resultant attrition of said particles, the finer particles being admixed with the air and caused to be discharged through said outlet at the upper end of said tubular member.

10. A device according to claim 9 wherein said outlet opening is a horizontally elongated slot.

11. A device according to claim 9, wherein said outlet opening includes a plurality of horizontally elongated slots at least some of which are in alignment with said blower.

12. A device according to claim 9, wherein said blower comprises spaced annular members interconnected by substantially radially extending blade elements with the center of said blower extending parallel to, but offset in respect to, the center of said tubular member.

13. A device according to claim 9, wherein said inlet openings extend tangentially into said tube.

References Cited

UNITED STATES PATENTS

| | | | |
|---|---|---|---|
| 405,281 | 6/1889 | Taggart | 241—284 X |
| 2,658,301 | 11/1953 | Merrill | 222—193 X |
| 2,983,453 | 5/1961 | Bourguet et al. | 241—5 X |

ROBERT C. RIORDON, *Primary Examiner.*

J. SPENCER OVERHOLSER, *Examiner.*

D. G. KELLY, *Assistant Examiner.*